US011931641B2

(12) United States Patent
Matson

(10) Patent No.: US 11,931,641 B2
(45) Date of Patent: Mar. 19, 2024

(54) EXERCISE APPARATUS WITH INTEGRATED HOLOGRAPHIC DISPLAY

(71) Applicant: Saga Holographic, Inc., Middletown, DE (US)

(72) Inventor: Samuel Mark Matson, Santa Monica, CA (US)

(73) Assignee: Saga Holographic, Inc., Middletown, DE (US)

( * ) Notice: Subject to any disclaimer, the term of this patent is extended or adjusted under 35 U.S.C. 154(b) by 228 days.

(21) Appl. No.: 17/334,441

(22) Filed: May 28, 2021

(65) Prior Publication Data

US 2022/0161120 A1 May 26, 2022

Related U.S. Application Data

(60) Provisional application No. 63/118,149, filed on Nov. 25, 2020.

(51) Int. Cl.
| | | |
|---|---|---|
| A63B 71/06 | (2006.01) | |
| A63B 22/02 | (2006.01) | |
| A63B 22/06 | (2006.01) | |
| A63B 24/00 | (2006.01) | |

(52) U.S. Cl.
CPC .......... *A63B 71/0622* (2013.01); *A63B 22/02* (2013.01); *A63B 22/0605* (2013.01); *A63B 24/0062* (2013.01); *A63B 2071/0636* (2013.01); *A63B 2071/0638* (2013.01); *A63B 2220/806* (2013.01)

(58) Field of Classification Search
CPC . A63B 71/0622; A63B 22/02; A63B 22/0605; A63B 24/0062; A63B 2071/0636; A63B 2071/0638; A63B 2220/806
See application file for complete search history.

(56) References Cited

U.S. PATENT DOCUMENTS

| 10,874,340 B2 * | 12/2020 | Rau ........................ G16H 40/67 |
| 2003/0078138 A1 | 4/2003 | Toyama |
| 2006/0063644 A1 | 3/2006 | Yang |

(Continued)

FOREIGN PATENT DOCUMENTS

| CN | 201308742 | 9/2009 | |
| KR | 101461202 B1 * | 11/2014 | ............. A63B 22/02 |

(Continued)

OTHER PUBLICATIONS

International Search Report and Written Opinion dated Feb. 15, 2022 in PCT/US/2021/060628.

(Continued)

*Primary Examiner* — Sundhara M Ganesan
*Assistant Examiner* — Jacqueline N L Loberiza
(74) *Attorney, Agent, or Firm* — Enable IP, P.C.

(57) ABSTRACT

Stationary exercise machine with integrated holographic display to simulate depth and motion is disclosed. The disclosure uses an integrated and responsive 3-dimensional (3D) or holographic display attached to and/or integrated with stationary exercise equipment to create a more immersive, engaging and enjoyable stationary exercise experience. The 3D or holographic display provides a more stimulating sensory experience and can better simulate the perception of depth and motion through a 3D virtual environment.

19 Claims, 4 Drawing Sheets

(56) References Cited

U.S. PATENT DOCUMENTS

| | | |
|---|---|---|
| 2006/0122035 A1 | 6/2006 | Felix |
| 2007/0229397 A1* | 10/2007 | Sefton ................ A63B 71/0622 |
| | | 348/E13.059 |
| 2013/0225369 A1 | 8/2013 | Fisbein et al. |
| 2014/0295970 A1 | 10/2014 | Gronkowski et al. |
| 2017/0197113 A1 | 7/2017 | Robinson et al. |
| 2017/0312614 A1* | 11/2017 | Tran .......................... G06F 3/00 |
| 2021/0046373 A1* | 2/2021 | Smith ................ A63B 71/0622 |

FOREIGN PATENT DOCUMENTS

| | | | | |
|---|---|---|---|---|
| KR | 20190081137 A * | 7/2019 | ......... | A63B 24/0087 |
| WO | 2017047527 A1 | 3/2017 | | |
| WO | WO-2017047527 A1 * | 3/2017 | ............. | A63B 22/02 |
| WO | WO-2020033530 A1 * | 2/2020 | ........... | A61B 5/0022 |
| WO | WO-2020218368 A1 * | 10/2020 | ......... | A63B 71/0622 |

OTHER PUBLICATIONS

International Preliminary Report on Patentability dated May 30, 2023 for International Application No. PCT/US2021/060628, filed Nov. 23, 2021.

* cited by examiner

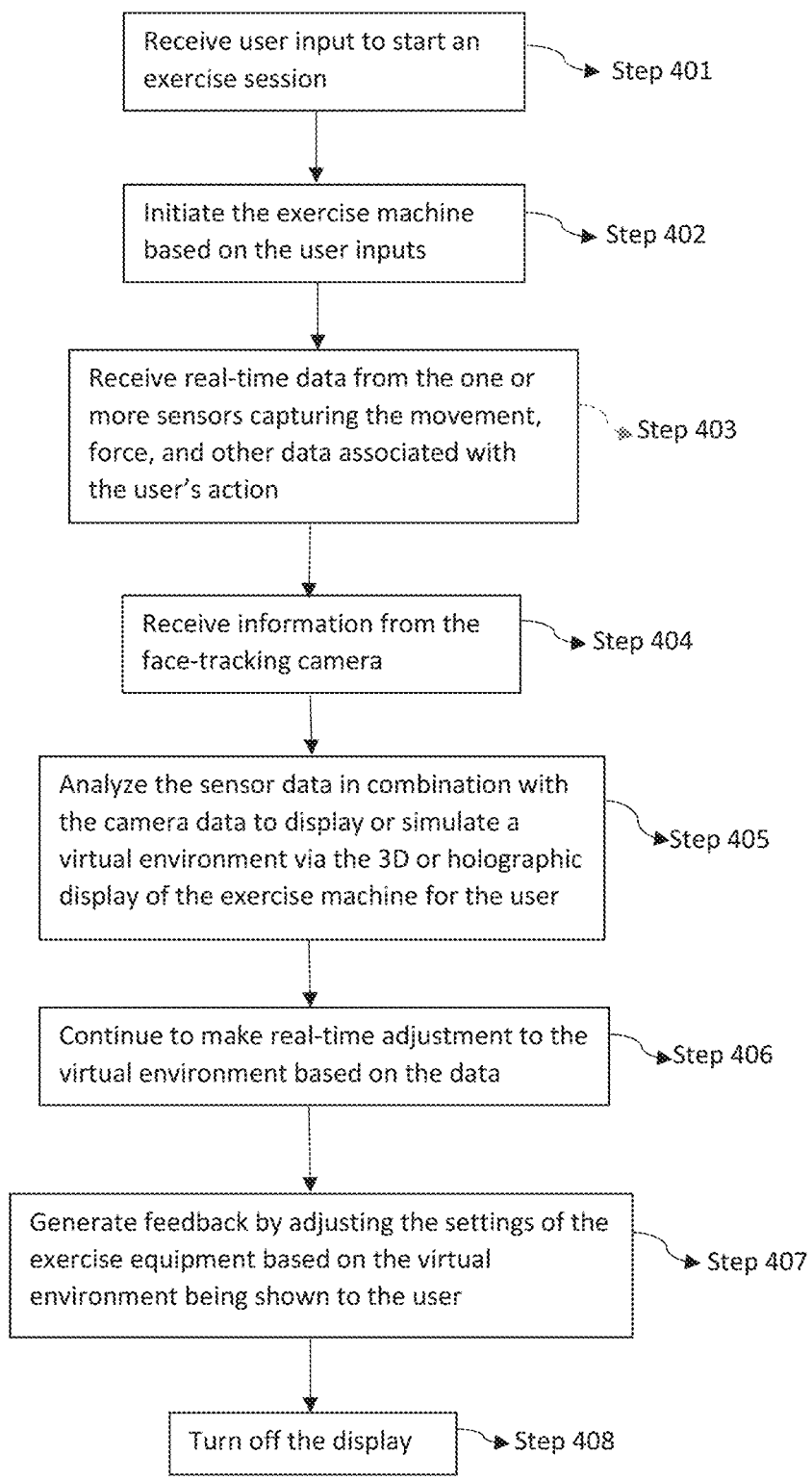

ental health benefits during exercise. While other systems use virtual reality and augmented reality headsets or eyewear connected to exercise equipment to simulate motion, they are also cumbersome to wear and are prone to cause nausea or motion-sickness.

EXERCISE APPARATUS WITH INTEGRATED HOLOGRAPHIC DISPLAY

FIELD

This relates to an exercise apparatus and, more specifically, to an exercise machine with an integrated holographic display.

BACKGROUND OF THE INVENTION

Current stationary exercise equipment like treadmills, ellipticals, rowing machines, stationary bikes and weight machines can be monotonous to use. While some come with integrated displays for entertainment while exercising, these displays fail to provide rich sensory immersion and the sense of motion that make outdoor exercise like running, rowing or cycling engaging to athletes.

Some existing stationary exercise equipment with 2-dimensional (2D) displays attempt to mitigate the monotony of stationary exercise with on-screen media, but they do not provide the stereoscopic visuals and head-motion parallax that are required to simulate depth perception and convincing motion through 3-dimensional (3D) space, making them less immersive and less engaging than their non-stationary counterparts for outdoor course or indoor track exercise. Stationary exercise is advantageous for several reasons including that it can be done from the comfort of one's home or gym, regardless of weather conditions outside. However, current stationary exercise equipment does not offer the immersive visuals and perception of motion that can increase enjoyment and engagement and enhance therapeutic mental health benefits during exercise. While other systems use virtual reality and augmented reality headsets or eyewear connected to exercise equipment to simulate motion, they are also cumbersome to wear and are prone to cause nausea or motion-sickness.

There is no existing exercise equipment that can provide an immersive experience without requiring the user to wear a headset.

SUMMARY

Embodiments of the disclosure use an integrated and responsive 3D or holographic display attached to and/or integrated with stationary exercise equipment to create a more immersive, engaging and enjoyable stationary exercise experience. The 3D or holographic display provides a more stimulating sensory experience and can better simulate the perception of motion through a 3D virtual environment.

BRIEF DESCRIPTION OF THE DRAWINGS

The foregoing and other features of the present disclosure will become more fully apparent from the following description and appended claims, taken in conjunction with the accompanying drawings. These drawings depict only several embodiments in accordance with the disclosure and are, therefore, not to be considered limiting of its scope. The disclosure will be described with additional specificity and detail through use of the accompanying drawings.

FIG. 4 is a flowchart illustrating the exemplary steps of a method of providing an immersive experience using exercise apparatus, according to an embodiment of the disclosure.

DETAILED DESCRIPTION OF THE INVENTION

Figure 1:
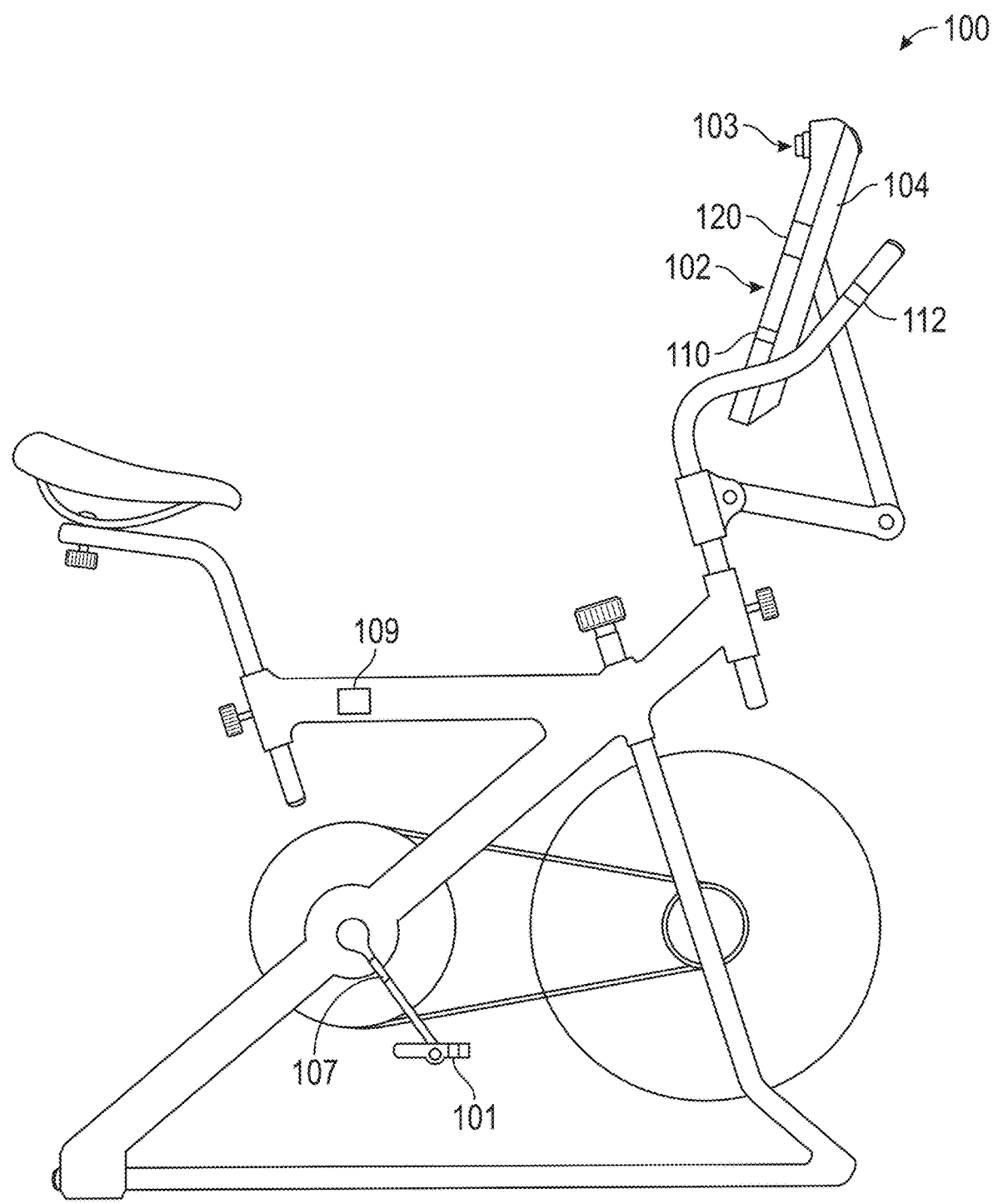
FIG. 1 illustrates an exemplary exercise apparatus, according to an embodiment of the disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

The terms "exercise apparatus," "exercise equipment," and "exercise machine" are used interchangeably in this document.

The terms "holographic", "3D", "spatial", "volumetric" are used interchangeably in reference to display technology. They describe various systems that enable on-screen visuals to appear different to each of the users eyes (i.e. stereoscopic visuals) and based on the position of the users head (i.e. head-motion parallax), which serve to accurately simulate depth and motion through 3D space. These systems can include lenticular displays, retinal projectors, and/or lightfield displays, as well as face-tracking cameras to optimize imagery based on the position of the user's eyes and head. These methods of display do not require headwear or eyewear, as in other virtual or augmented reality systems.

As stated above, current stationary exercise equipment like treadmills, ellipticals and stationary bikes can be monotonous to use. While some come with integrated displays for entertainment while exercising, these displays fail to provide rich sensory immersion and the sense of motion that make outdoor exercise like running or cycling engaging to athletes. Embodiments of the disclosure solve this problem.

To make stationary exercise machines more immersive and engaging, as well as to enhance their physical and mental health benefits, embodiments of the disclosure integrate an holographic display that responds when, for example, force is exerted on the stationary exercise machine (e.g. when the user pedals a stationary bicycle), changing the imagery on screen to simulate motion through a virtual environment.

In some embodiments, the 3D display can also be utilized more generally to make on-screen content more engaging and immersive (e.g. displaying 3D movies as the user exercises). To further increase the immersiveness of the exercise experience, the spatial display on the exercise equipment can integrate with spatial speakers to simulate sound in virtual space.

Embodiments of the disclosure differ from what currently exists. The embodiments use a holographic display attached to and/or integrated with stationary exercise equipment to provide stereoscopic visuals and head-motion parallax that enhance the exercise experience. Additionally, a holographic display that is integrated with the exercise equipment is less nausea-inducing and less cumbersome than a virtual or augmented reality head-mounted display.

Stationary exercise equipment, even those with displays, provide a less immersive and engaging experience than outdoor or track exercise. As a result of their 2D displays, they can only convey depth and motion in a limited capacity through monoscopic perspective (e.g. using monoscopic video that displays distant virtual objects smaller than nearby virtual objects). These systems are unable to provide stereoscopic visuals or head-motion parallax required for rich sensory stimulation and convincing perception of motion.

Embodiments of the disclosure use an integrated and responsive 3D or holographic display attached to and/or integrated with stationary exercise equipment to create a more immersive, engaging and healthy stationary exercise experience. The holographic display provides a more stimulating sensory experience and can better simulate the perception of motion through a 3D virtual environment.

Also, embodiments of the disclosure functions as a software content delivery system. The software content (e.g. software applications) delivered through exercise equipment can utilize the sensors, displays, cameras and exercise equipment in different ways to create different exercise experiences. For example, one software application might virtually simulate cycling the Tour de France with other live participants connected via the internet in an immersive 3D scene generated by photogrammetry depth capture. Another application might simulate running through a virtual forest realistically rendered from a game engine. Yet another might simulate a fitness class with a personal trainer appearing as an animated avatar in a virtual gym. Other content might include holographic music visualization or computational art. Any application can leverage the array of display(s), speaker(s), sensor(s), and exercise equipment in different ways to create unique 3D and holographic experiences.

The exercise equipment according to the disclosed embodiments can be stationary exercise equipment (e.g. stationary bike, treadmill, elliptical, rowing machine, etc.) with electronic sensors to detect force exerted by user and/or capture other information relating to the user's movement when using the exercise equipment.

The exercise equipment disclosed herein can include 3D or holographic display (e.g., those that can utilize lenticular display technology, light-field display technology or projector-based display technology), positional-tracking camera system (for face-tracking) to record position of the user's eyes to adapt imagery from 3D or holographic display and better simulate depth perception through a 3D virtual environment.

The exercise equipment disclosed herein can additionally include computer hardware/software such as one or more processors to interpret sensor and camera data and output graphical content through the display.

Embodiments of the exercise equipment can display virtual content through the 3D or holographic display.

In another aspect of the disclosure, a method of connecting to the internet to stream updates or access content to an exercise apparatus is disclosed. The connection can be mediated through a connection to a mobile phone or can connect directly to WiFi or cellular networks.

FIG. 1 illustrates a stationary exercise bike 100 with one or more electronic sensors 101 that can detect force exerted by the user when the user exercises on the stationary exercise bike 100. The sensor(s) can transmit data to a computer processor 104 of the stationary exercise bike 100. The computer processor 104 can interpret the sensor data and generate imagery that can be displayed through a 3D or holographic display 102 to simulate motion through a virtual environment as the user exercises.

The stationary exercise bike 100 can incorporate one or more sensors 101 to detect force exerted by the user and capture other data on how the user is using the stationary exercise bike 100. The sensors for detecting force and other data vary depending on the type of exercise equipment and may include potentiometers, gyroscopes and accelerometers as well as optical sensors like cameras. In some embodiments, the one or more sensors 101 can also include pressure sensors, rotation sensors, position sensors, cadence sensors, vibration sensors, etc.

In the embodiment illustrated in FIG. 1, the one or more sensors 101 can be embedded in, for example, the pedals, the handle grips, the seat bottom, and/or any other locations of the stationary exercise bike 100 that would allow the sensors 101 to capture data reflecting the how the user is using the stationary exercise bike 100.

For example, force sensors 101 in the pedals can detect the amount of force exerted by the user when pedaling. Alternatively or additionally, a cadence sensor 107 can be attached to the stationary bike's crank arm to measure the real time cadence when the stationary bike 100 is in use. Alternatively or additionally, one or more vibration sensors and/or accelerometers 109 can be attached or embedded in the frames of the stationary bike 100 to detect the vibration and/or tilting of the stationary bike 100 when in use. It should be understood that the exemplary sensors 101, 107, 109 shown in FIG. 1 can be positioned at locations other than those shown in FIG. 1. It should also be understood that not all illustrated sensors may be included and that additional sensors not shown in FIG. 1 can be added to the stationary bike 100 to capture additional data on how the user is using the stationary bike 100.

Additionally, one or more sensors 110 may be integrated with the display 102 to detect the position and orientation of the display 102. These may be used to adapt on-screen content, for example, so that the horizon line displayed on-screen matches the real-world horizon line regardless of the angle and orientation of the display. Sensor 110 can be an accelerometer or a position sensor.

The processor 104 can receive signal(s) from the one or more sensors 101 and determine based on the signal(s), for example, the real-time speed at which the user is pedaling the bike and adjust the 3D or holographic environment being displayed on the display 102 accordingly to have the proper simulation of the user biking through the simulated environment.

The stationary bike of FIG. 1 can also include a face-tracking camera 103. The face-tracking camera 103 is used to record the position of the user's eyes and the direction of their gaze. As illustrated in FIG. 1, the camera 103 can be attached or positioned facing the user at the top of the display screen 102 of the stationary bike 100. It should be understood that, depending on the type and specification of the camera used, the camera 103 can be positioned in any place on the stationary bike that would allow it to accurately track and record the user's eye movements. In some embodiments, multiple cameras can be used to provide a wider area of coverage.

The camera 103 can send in real time a signal embedding the information it captured to the processor 104. The processor can then process the signal from the camera to determine imagery output through the 3D or holographic display 102 that can adapt and accurately simulate depth-perception and motion through virtual space. As a result, while the user exerts force on the stationary exercise bike, the imagery displayed through the 3-dimensional or holographic display can respond to simulate motion through virtual space.

The 3D or holographic display 102 can be any existing display capable of providing content in a way that provides the user an immersive experience while using the stationary bike 100 without requiring the user to wear any virtual reality (VR) headset. For example, the 3-dimensional or holographic display 102 may utilize a lenticular display paired with the face-tracking camera 103 to detect the user's eye position. The lenticular display can rapidly output image frames directed alternately at the user's right and left eye to simulate stereoscopic depth perception. The imagery adapts to the position of the user's eyes to simulate visual parallax. Alternatively, the 3-dimensional or holographic display 102 can be a light-field, which directs photons along the proper vector to simulate their trajectory from a virtual scene and create the perception of depth. Lastly, holographic projectors provide another alternate method of simulating depth perception by tracking the user's eye position with the camera 103 and then projecting different images into each of the user's eyes to create a stereoscopic view of a virtual scene. The embodiments of the disclosure can use any of these methods or a combination of them.

The virtual content output through the 3-dimensional or holographic display 102 can respond to the sensor data input from the one or more sensors 101 of the stationary exercise bike 100. Conversely, the stationary exercise bike can adapt to virtual content. For example, to simulate a virtual hill, the resistance of the pedals of a stationary bicycle might increase to give the user a sense of pedaling up an actual hill. Additionally, the virtual content can adapt and respond to the positional-tracking cameras 103 to better simulate depth-perception. As well, the face-tracking cameras 103 might be used to better understand how the user is perceptually, emotionally, physiologically and psychologically experiencing their exercise. The virtual content can adapt to this information to optimize and customize the exercise experience for each individual user. For example, the camera(s) 103 might detect infrared light output from the user's body to infer heart-rate and blood-flow and adjust the exercise intensity to maintain a constant, optimum heart-rate. Additionally or alternatively, the exercise equipment might use a combination of cameras 103 with one or more electrodermal sensors 112 (positioned in the handlebars, for example) to detect perspiration and infer hydration levels to then prompt the user to drink liquid when needed. An array of sensors including cameras (e.g., camera 103), cadence and resistance sensors and electrodermal sensors (e.g., sensor 112) might track and interpret subtle variations in perspiration, heart-rate, exertion, eye-movement, facial expression, exercise technique, etc. to infer when the user is experiencing a peak rush of euphoria (known as "runner's high") while exercising and synchronize visual and audio content to enhance euphoria, for example, by displaying more exciting imagery and louder music that match the rhythm of the user's heart rate or exercise cadence. The audio content can be stored locally in a storage of the stationary exercise bike 101 or streamed from a remote source (e.g., a cloud server). The audio content can be synchronized with the visual content by the processor 104 in response to data captured by the one or more sensors 101, 107, 109, 110, 112, and camera(s) 103. One or more speakers 120 located at different locations on the stationary exercise bike 101 can output the audio content with the intended effects and/or volume.

Although the 3-dimensional or holographic display 102 is shown to have a flat display surface, it should be understood that the display 102 can have a surface of any type and any curvature. It should also be understood that the 3-dimensional or holographic display 102 can include multiple screens that combine to create the immersive visual experience to the user. It should also be understood that the display 102 can be of any size and shape.

The computer processor 104 can be any computer processor capable of processing signals from the camera 103 and the one or more sensors 101, 107, 109 of the stationary bike 100. Although the processor 104 is illustrated to be located in a housing behind the 3-dimensional or holographic display 102 in FIG. 1, it should be understood that the processor can be located at any part of the stationary bike 100, for example, the processor might be positioned near to the flywheel to leverage airflow for enhanced thermal dissipation to accommodate the intense heat resulting from the heavy graphical processing required to display holographic content.

Content to be shown on the 3D or holographic display 102 and software or firmware updates can be streamed or downloaded over the internet. For example, the user can select a stage of the Tour de France to be rendered by the 3D or holographic display 102 while using the bike 100 to simulate competing in the race. Specifically, the 3D or holographic display 102 can display pre-existing (e.g., downloaded) continuous footage of a Tour de France race captured using an omnidirectional, stereoscopic camera on a vehicle (e.g., a bicycle or a car). The footage can be shown at a pace that corresponds to the user's pace on the stationary bike 100 and from different angles that change in response to the user's eye movements captured by the face tracking camera 103.

Figure 2:
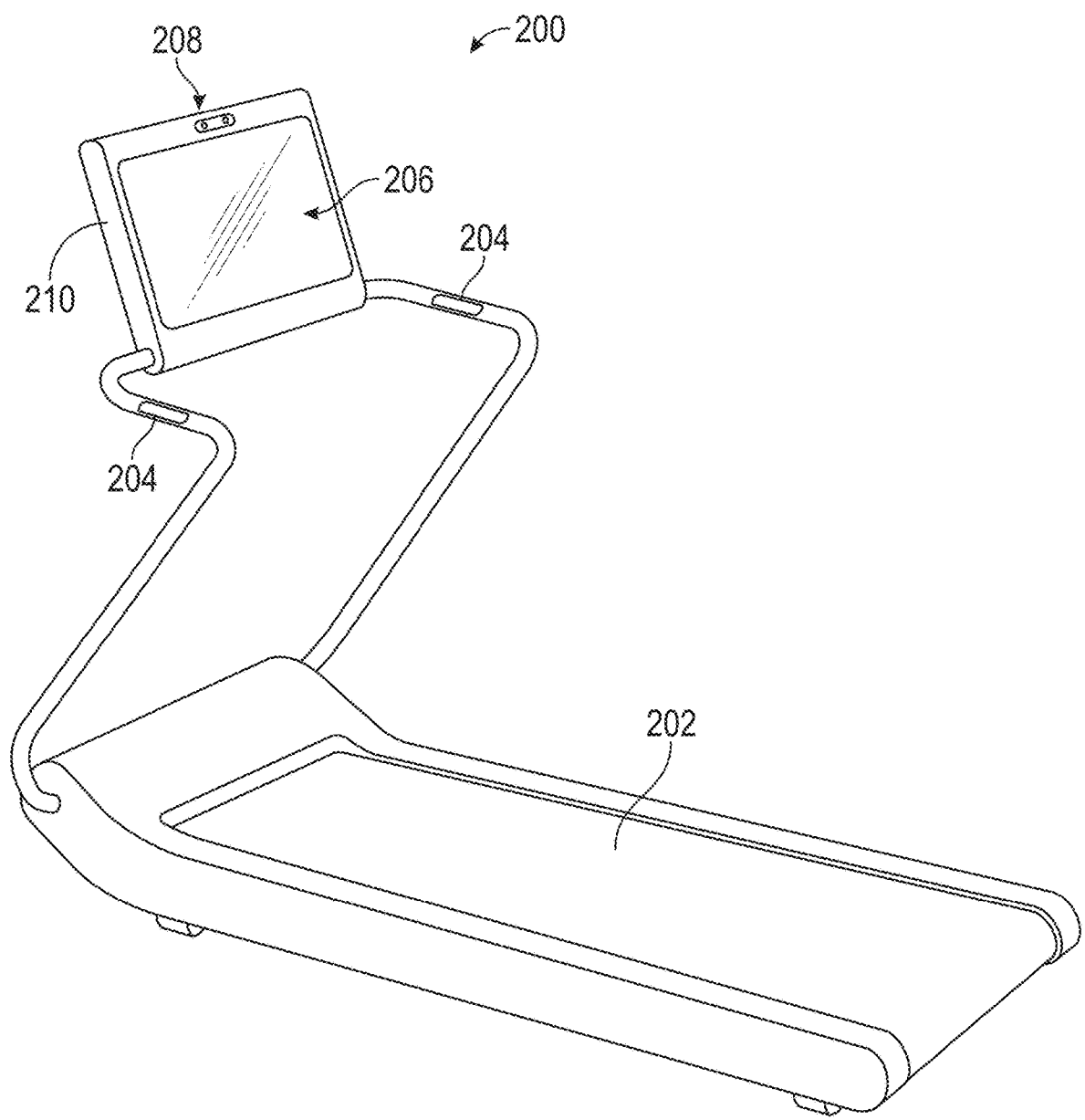
FIG. 2 illustrates another exemplary exercise apparatus, according to an embodiment of the disclosure.

FIG. 2 illustrates a treadmill 200 capable of providing virtual and immersive content for the user, according to another embodiment of the disclosure. Similar to the stationary bike of FIG. 1, the treadmill 200 can also include one or more sensors 202, 204, a 3-dimensional or holographic display 206, a facial-tracking camera 208 located at the top of the 3-dimensional or holographic display 206, and a computer processor 210 in communication with the sensors 202, 204, 3-dimensional or holographic display 206, and camera 208.

Sensor 202 can be a sensor placed under the belt of the treadmill to detect the force, timing, and/or location of the contact made by the user's feet. Sensor 202 can be multiple sensors placed at different locations under the belt. Additionally or alternatively, sensors 204 can be placed on areas on the top handlebars of the treadmill to detect any force from the user gripping the handle bars. Data detected by the sensors 202, 204 can be transmitted to the computer processor 210 of the treadmill 200.

The 3-dimensional or holographic display 206 and the face-tracking camera 208 of the treadmill 200 can be similar to the 3-dimensional or holographic display 102 and face-tracking camera 103 of the stationary bike 100 of FIG. 1, respectively. Data captured from the camera 208 can be transmitted to the processor 210.

The processor 210 can process data received from the sensors 202, 204 and the camera 208 and the settings (e.g., degree of incline, speed setting) of the treadmill to determine the user's pace, lateral movement, head/eye movement, etc. when the user is using the treadmill 200. The processor 210 can then display on the display 206 a 3-dimensional or holographic imageries that simulate an immersive visual experience (e.g., running through a forest or on a race track against other runners) for the user. The imageries can be a video being streamed in real time or content pre-downloaded from a remote server such as a cloud server.

The treadmill 200 can optionally include additional sensors not shown in FIG. 2 and speakers for outputting audio content synchronized with the visual content displayed on the display 206 based on data captured by the sensors.

It should be understood that both the stationary exercise bike 100 of FIG. 1 and the treadmill 200 of FIG. 2 are examples of the present disclosure. In other embodiments, other types of exercise equipment such as rowing machines, ellipticals, ski exercise machines, boxing machines can also incorporate sensors, face-tracking cameras, and 3-dimensional or holographic displays in a similar fashion as described above to provide similar immersive experience for the users.

Figure 3:
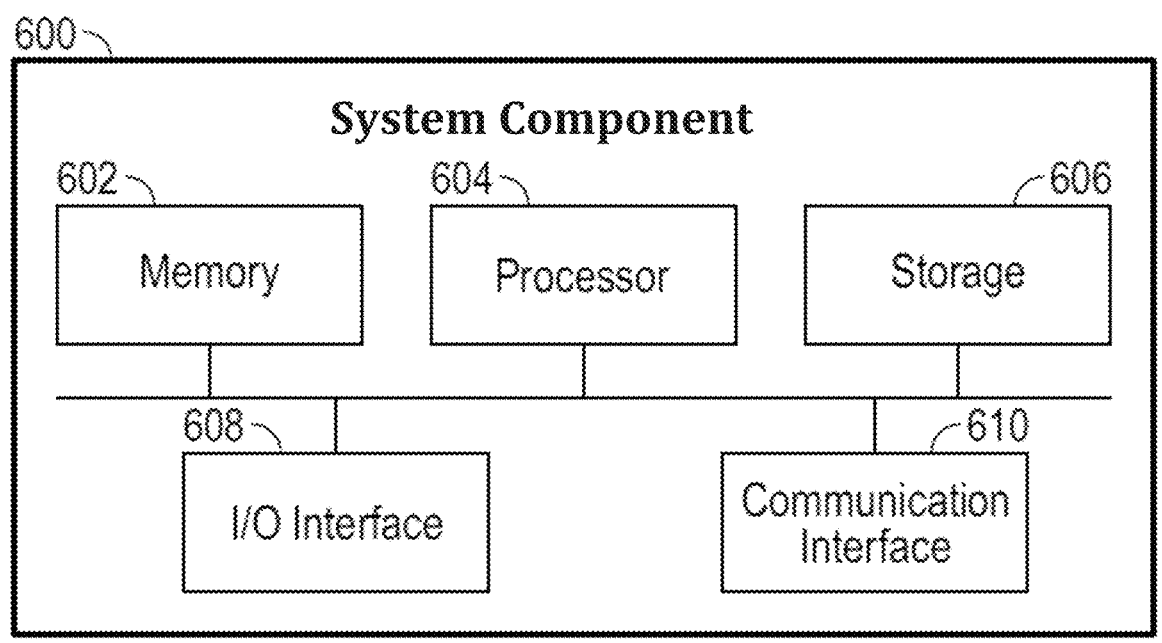
FIG. 3 is a block diagram illustrating the exemplary hardware components of an exercise apparatus.

FIG. 3 illustrates the exemplary system components of an exercise apparatus 600 such as the stationary bike 100 of FIG. 1 or the treadmill 200 of FIG. 2, according to an embodiment of the disclosure. The system components can include a memory 602, a processor 604, a storage 606, an input/output (I/O) interface 608, and a communication interface 610.

Processor 604 may include any appropriate type of general-purpose or special-purpose microprocessor, digital signal processor, or microcontroller. Processor 604 may be configured to receive data and/or signals from sensors, camera, other types of user interface such as a keypad or a touch screen, and/or other devices on the network and process the user input and received data and/or signals to determine the settings of the exercise apparatus including what content to be provided via the 3-dimensional or holographic display and how the content is provided.

Processor 604 may execute computer instructions (program codes) stored in memory 602 and/or storage 606, and may perform functions in accordance with exemplary techniques described in this disclosure. Memory 602 and storage 606 may include any appropriate type of mass storage provided to store any type of information that processor 604 may need to operate. Memory 602 and storage 606 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 602 and/or storage 606 may be configured to store one or more computer programs that may be executed by processor 604 to perform exemplary functions disclosed in this disclosure including generating content for displaying on the 3-dimensional or holographic display of the exercise apparatus. For example, memory 602 and/or storage 606 may be configured to store program(s) that may be executed by processor 604 to determine the speed at which the content is being played on the display based on the pace of the user running on the treadmill. The program(s) may also be executed by processor 604 to provide an interface for interacting with a user.

Memory 602 and/or storage 606 may be further configured to store information and data used by processor 604. Memory 602 and/or storage 606 may be configured to store real-time streaming or pre-downloaded video content and/or software updates to the exercise machine.

Referring again to FIG. 3, communication interface 610 may be configured to facilitate the communication between the exercise apparatus 600 and other devices on the network. The communication interface 610 can be configured to transmit and receive signals/data via wireless network connections. For example, the exercise apparatus 600 can communicate via the communication interface 610 with a remote server to download content or updates to the various programs running on the exercise apparatus 600. Other known communication methods, which provide a medium for transmitting data are also contemplated. The communication interface 610 can additionally support wired communications as well.

I/O interface 608 can allow the exercise apparatus 600 to interact with a user. For example, the I/O interface 608 can be a touch screen that displays an interactive screen for the programs (or apps) running on the exercise apparatus 600. The touch screen can also receive touch or gesture input from a user. Any other conventional I/O interface can also be incorporated into the apparatus.

In another aspect of the disclosure, a method of providing an immersive experience to a user of an exercise machine is provided. The method can be performed by software, firmware, hardware, and/or a combination thereof. The software and firmware can be stored in a local storage or hosted on a remote server connected to the exercise equipment.

FIG. 4 illustrates the exemplary steps in the method of providing an immersive experience to the user of an exercise equipment. First, the processor of exercise equipment receives user input to start an exercise session (step 401). The user input may include specific settings of the equipment (e.g., speed of a treadmill, time duration for the session) and a selection of a particular virtual environment to be shown on the display of the exercise equipment. The virtual environment can simulate a real race (e.g., the Tour de France race), a particular environment (e.g., beach, forest, or gym), or a computer generated virtual environment such as those seen in computer games.

Next, the processor initiates the exercise machine based on the user inputs (step 402). As the user starts exercising on the exercise machine, the processor can receive real-time data from the one or more sensors capturing the movement, force, and other data associated with the user's action (step 403). Similarly, the processor can also receive information from the face-tracking camera that tracks, for example, the user's eye movement (step 404). The processor can analyze the sensor data in combination with the camera data to display or simulate a virtual environment via the 3D or holographic display of the exercise machine for the user (step 405). The processor can optionally continue to make real-time adjustment to the virtual environment based on the data received from the sensors and the camera (step 406). Additionally or alternatively, the processor can generate feedback (e.g., changing the incline on the treadmill) by adjusting the settings of the exercise equipment based on the virtual environment being shown to the user (step 407). When the user finishes his/her exercise, the processor can turn off the display (step 408).

In yet another aspect of the disclosure, embodiments of exercise equipment can also function as a software content delivery system. The software content (i.e. software applications) delivered through the exercise equipment can utilize the sensors, displays, cameras and exercise equipment in different ways to create different exercise experiences. For example, one software application might virtually simulate cycling the Tour de France with other live participants connected via the internet. Another application might simulate running through the woods. Any application can leverage the array of display(s), sensors, and exercise equipment in different ways to create unique experiences for the user.

It will be apparent to those skilled in the art that various modifications and variations can be made to the disclosed systems and methods. Other embodiments will be apparent to those skilled in the art from consideration of the specification and practice of the systems and methods. It is intended that the specification and examples be considered as exemplary only, with a true scope being indicated by the following claims and their equivalents.

What is claimed is:

1. An exercise apparatus comprising:
   one or more sensors configured to capture user exercise data;
   a face-tracking camera configured to track the eye movements of a user of the exercise apparatus;
   a processor configured to
      receive the captured user exercise data from the one or more sensors,
      receive data on the eye movements of the user from the face-tracking camera, and
      generate a virtual environment based on the user exercise data and the data on the eye movements of the user; and
   a non-wearable display configured to display the virtual environment to the user;
   wherein the non-wearable display comprises a lenticular display configured to be paired with the face-tracking camera to detect the user's eye positions; and
   wherein the non-wearable display is further configured to display an imagery that adapts to the position of each of the user's eyes to simulate stereoscopoic parallax.

2. The exercise apparatus of claim 1, wherein the exercise apparatus is a stationary exercise bike and the virtual environment comprises a virtual course.

3. The exercise apparatus of claim 1, wherein the one or more sensors comprises one or more of potentiometers, gyroscopes, accelerometers, pressure sensors, rotation sensors, position sensors, cadence sensors, and vibration sensors.

4. The exercise apparatus of claim 3, wherein the processor is further configured to track a movement of the user in response to the user exercise data captured by the one or more sensors.

5. The exercise apparatus of claim 1, wherein the display is a 3-dimensional or holographic display.

6. The exercise apparatus of claim 1, wherein the lenticular display is configured to rapidly output image directed respectively at the user's right and left eyes to simulate stereoscopic depth perception.

7. The exercise apparatus of claim 1, wherein the display comprises a light-field configured to direct photons along the proper vector to simulate their trajectory from a virtual scene and create a perception of depth.

8. The exercise apparatus of claim 1, wherein the display comprises holographic projectors configured to simulate depth perception by tracking the user's eye position using the face-tracking camera and project different images into each of the user's eyes to create a stereoscopic view of a virtual scene.

9. The exercise apparatus of claim 1, wherein one of the one of more sensors is configured to detect a position or an orientation of the display; and wherein the processor is further configured to adjust a horizon in the virtual environment in response to the position or orientation of the display.

10. The exercise apparatus of claim 1, wherein the processor is further configured to download information from a remote server, the information comprising software updates or content for use in generating the virtual environment.

11. The exercise apparatus of claim 1, wherein the exercise apparatus is a treadmill and the virtual environment comprises a simulation of a real world location.

12. The exercise apparatus of claim 1, wherein the processor is further configured to adjust a setting of the exercise apparatus in response to the virtual environment being displayed on the display.

13. The exercise apparatus of claim 12, wherein the setting of the exercise apparatus comprises a degree of incline and the degree of incline is adjusted in response to a displayed change of elevation in the virtual environment.

14. A method of providing an immersive exercising experience to a user of an exercising apparatus, the exercising apparatus comprising one or more sensors, a face-tracking camera, a non-wearable display comprising a lenticular display, and a processor in communication with the one or more sensors, the face tracking camera, and the display, the method comprising:
   capturing, by the one or more sensors, user exercise data;
   tracking, by the face-tracking camera, the eye movements of a user of the exercise apparatus;
   receiving, by the processor, the captured user exercise data from the one or more sensors,
   receiving, by the processor, data on the eye movements of the user from the face-tracking camera, and
   generating, by the processor, a virtual environment based on the user exercise data and the eye movements of the user;
   displaying, on the non-wearable display, the virtual environment to the user;
   pairing the lenticular display with the face-tracking camera to detect the user's eye positions; and
   displaying, by the non-wearable display, an imagery that adapts to the position of each of the user's eyes to simulate stereoscopic parallax.

15. The method of claim 14, further comprises tracking a movement of the user in response to the user exercise data captured by the one or more sensors.

16. The method of claim 14, wherein the display comprises holographic projectors, and wherein the method further comprises simulating, by the holographic projectors, depth perception by tracking the user's eye position using the face-tracking camera; and projecting different images into each of the user's eyes to create a stereoscopic view of a virtual scene.

17. The method of claim 14, further comprising adjusting, by the processor, a setting of the exercise apparatus in response to the virtual environment being displayed on the display.

18. The method of claim 14, further comprising downloading, by the processor, information from a remote server, the information comprising software updates or content for use in generating the virtual environment.

19. An exercise apparatus comprising:
   one or more sensors configured to capture user exercise data;
   a face-tracking camera configured to track the eye movements of a user of the exercise apparatus;
   a processor configured to
      receive the captured user exercise data from the one or more sensors,
      receive data on the eye movements of the user from the face-tracking camera, and
      generate a virtual environment based on the user exercise data and the data on the eye movements of the user; and
   a non-wearable display configured to display the virtual environment to the user;
   wherein the face-tracking camera is further configured to detect infrared light from the user's body; and wherein the processor is further configured to determine a heart rate and blood flow from the detected infrared light and adjust an exercise intensity of the exercise apparatus to maintain an optimum heart rate of the user.

* * * * *